(12) United States Patent
Hong

(10) Patent No.: US 11,402,633 B2
(45) Date of Patent: Aug. 2, 2022

(54) HEAD-UP DISPLAY DEVICE, METHOD FOR CONTROLLING THE SAME, AND VEHICLE

(71) Applicant: BOE Technology Group Co., Ltd., Beijing (CN)

(72) Inventor: Tao Hong, Beijing (CN)

(73) Assignee: BOE Technology Group Co., Ltd., Beijing (CN)

(*) Notice: Subject to any disclaimer, the term of this patent is extended or adjusted under 35 U.S.C. 154(b) by 377 days.

(21) Appl. No.: 16/479,281

(22) PCT Filed: Oct. 30, 2018

(86) PCT No.: PCT/CN2018/112777
§ 371 (c)(1),
(2) Date: Jul. 19, 2019

(87) PCT Pub. No.: WO2019/184335
PCT Pub. Date: Oct. 3, 2019

(65) Prior Publication Data
US 2021/0033863 A1    Feb. 4, 2021

(30) Foreign Application Priority Data

Mar. 28, 2018   (CN) .......................... 201810267025.6

(51) Int. Cl.
*G02B 27/01* (2006.01)
*B60K 35/00* (2006.01)
*G02B 27/28* (2006.01)

(52) U.S. Cl.
CPC .......... *G02B 27/0103* (2013.01); *B60K 35/00* (2013.01); *G02B 27/283* (2013.01);
(Continued)

(58) Field of Classification Search
CPC .. G02B 27/0103; G02B 27/01; G02B 27/283; G02B 27/286; G02B 2027/0127;
(Continued)

(56) References Cited

U.S. PATENT DOCUMENTS

2009/0009455 A1* 1/2009 Kimura ................ G09G 3/2074
345/89
2012/0099170 A1* 4/2012 Shikii ................ G02B 27/0103
359/3
(Continued)

FOREIGN PATENT DOCUMENTS

CN          203433207 U       2/2014
CN          106353884 A       1/2017
(Continued)

OTHER PUBLICATIONS

Machine translation of WO 2015190157 downloaded from PE2E Search Aug. 25, 2021 (Year: 2021).*
(Continued)

*Primary Examiner* — Cara E Rakowski
(74) *Attorney, Agent, or Firm* — ArentFox Schiff LLP; Michael Fainberg

(57) ABSTRACT

A head-up display device, a method for controlling the same, and a vehicle are provided. The head-up display device includes a display component, a first optical component, a second optical component, and a synthesizing component. The light in different polarization directions or states can be transmitted or reflected by the first optical component, so that state information projection light and augmented reality information projection light can be separated from each other to thereby be dual-layer displayed. For example, augmented reality information can be displayed at a longer distance from eyes of a driver so that the focus of the human eyes does not need to be adjusted frequently to thereby make it comforter to view the information so as to eliminate a hidden risk.

15 Claims, 4 Drawing Sheets

(52) U.S. Cl.
CPC .... *G02B 27/286* (2013.01); *B60K 2370/1529* (2019.05); *B60K 2370/29* (2019.05); *B60K 2370/334* (2019.05); *B60K 2370/52* (2019.05); *G02B 2027/0127* (2013.01)

(58) Field of Classification Search
CPC ............... G02B 27/0101; B60K 35/00; B60K 2370/1529; B60K 2370/29; B60K 2370/52; B60K 2370/334
See application file for complete search history.

(56) References Cited

U.S. PATENT DOCUMENTS

| | | |
|---|---|---|
| 2017/0269428 A1 | 9/2017 | Otani et al. |
| 2017/0336628 A1 | 11/2017 | Kim et al. |
| 2018/0124364 A1* | 5/2018 | Yata ................. H04N 9/3179 |
| 2019/0041636 A1 | 2/2019 | Shi |

FOREIGN PATENT DOCUMENTS

| | | | |
|---|---|---|---|
| CN | 205899144 A | 1/2017 | |
| CN | 107003526 A | 8/2017 | |
| CN | 107422477 A | 12/2017 | |
| CN | 107479199 A | 12/2017 | |
| CN | 108490613 A | 9/2018 | |
| EP | 3118667 A | 1/2017 | |
| JP | 2014191321 A | 10/2014 | |
| WO | WO-2015190157 A1 * | 12/2015 | ............... G02B 5/30 |

OTHER PUBLICATIONS

Chinese Office Action dated May 22, 2019 for corresponding application CN 201810267025.6.

* cited by examiner

HEAD-UP DISPLAY DEVICE, METHOD FOR CONTROLLING THE SAME, AND VEHICLE

This application is a US National Stage of International Application No. PCT/CN2018/112777, filed Oct. 30, 2018, which claims priority to Chinese Patent Application No. 201810267025.6, filed with the Chinese Patent Office on Mar. 28, 2018, and entitled "Head-up display device, Method for controlling the same, and Vehicle", which is hereby incorporated by reference in its entirety.

FIELD

The present disclosure relates to the field of display technologies, and particularly to a head-up display device, a method for controlling the same, and a vehicle.

BACKGROUND

A Head-Up Display (HUD) has been widely applied gradually in the field of vehicles.

In the head-up display, important information (e.g., a vehicle speed), navigation, and other information displayed on an instrument panel while a vehicle is traveling is projected onto a front windshield so that a driver can see the information on the instrument panel without looking down. In this way, a novice at driving, who is inexperienced in deciding on the speed can be assisted in controlling the speed of his or her vehicle, and more importantly the driver can get the reading instantaneously without diverting his or her general field of view so that the driver will not take any effectual measure in a timely manner when an urgent accident occurs while he or she is looking down at the information displayed on the instrument panel, or information displayed from an acoustics system.

In the existing head-up display, generally a 2D display image is projected to some fixed distance in front of the driver, and the driver has to adjust the focus of his or her eyes to thereby focus the human eyes onto an image plane of the 2D display image so as to watch the information on the head-up display. However when the driver frequently adjusts the focus of his or her eyes while driving, then his or her eyes may be easily fatigued, and a traffic accident may occur.

SUMMARY

An embodiment of the disclosure is to provide a head-up display device with a dual-layer display function, a method for controlling the same, and a vehicle so as to make it more convenient to view the information.

In order to achieve the object above, an embodiment of the disclosure discloses a head-up display device. The head-up display device includes: a display component, a first optical component, a second optical component, and a synthesizing component, wherein the display component is configured to output first projection light and second projection light to the first optical component, wherein the first projection light has a first polarization direction, and the second projection light has a second polarization direction; the first optical component is configured to transmit the first projection light and third projection light to the synthesizing component, and to reflect the second projection light to the second optical component, wherein the third projection light has the first polarization direction; the second optical component is configured to convert the polarization direction of the second projection light from the second polarization direction to the first polarization direction to obtain the third projection light, and to reflect the third projection light back to the first optical component; and the synthesizing component is configured to receive the first projection light transmitted through the first optical component to synthesize a first image, and to receive the third projection light transmitted through the first optical component to synthesize a second image.

Optionally the display component includes: a display element configured to output a first projection image and a second projection image alternately; and a third optical module configured to convert light of the first projection image into the first projection light in the first polarization direction, to convert light of the second projection image into the second projection light in the second polarization direction, and output the first projection light and the second projection light to the first optical component.

Optionally the third optical module includes: a polarization converting element configured to convert the light of the first projection image into the first projection light in the first polarization direction, and to convert the light of the second projection image into the second projection light in the second polarization direction; and a first reflecting mirror configured to reflect the first projection light and the second projection light from the polarization converting element to the first optical component.

Optionally a reflecting surface of the first reflecting mirror is a plane, a spherical surface, an aspheric surface, or a free form surface.

Optionally the first projection image and the second projection image are output alternately at a frequency 60 Hz or higher.

Optionally the first optical component includes a polarized light splitting element.

Optionally a reflecting surface of the polarized light splitting element is a plane, a spherical surface, an aspheric surface, or a free form surface.

Optionally the second optical component includes a second reflecting mirror and a quarter-wave plate, the quarter-wave plate being between the reflecting mirror and the first optical component.

Optionally a reflecting surface of the second reflecting mirror is a plane, a spherical surface, an aspheric surface, or a free form surface.

Optionally the synthesizing component includes: a first synthesizer configured to receive the first projection light transmitted through the first optical component, and to synthesize the first image; and a second synthesizer configured to receive the third projection light transmitted through the first optical component, and to synthesize the second image.

Optionally the first synthesizer and/or the second synthesizer are holographic optical elements.

Optionally the synthesizing component is a semi-transmitting optical element; and the first image is a state information projection image, and the second image is an augmented reality information projection image.

In order to achieve the object above, an embodiment of the disclosure discloses a vehicle including the head-up display device according to any one of the solutions above.

In order to achieve the object above, an embodiment of the disclosure discloses a method for controlling the head-up display device according to any one of the solutions above. the method includes: outputting the first projection light and the second projection light to the first optical component, wherein the first projection light has the first polarization direction, and the second projection light has the second polarization direction; transmitting the first projection light and the third projection light, and reflecting the second projection light, wherein the third projection light has the first polarization direction; converting the polarization direction of the second projection light from the second polarization direction to the first polarization direction to obtain the third projection light, and reflecting the third projection light back to the first optical component; and receiving the first projection light transmitted through the first optical component to synthesize the first image, and receiving the second projection light transmitted through the first optical component to synthesize the second image.

Optionally the outputting the first projection light and the second projection light to the first optical component includes: outputting the first projection image and the second projection image alternately; and converting the light of the first projection image into the first projection light in the first polarization direction, converting the light of the second projection image into the second projection light in the second polarization direction, and outputting the first projection light and the second projection light to the first optical component.

The embodiments of the disclosure include the following advantages over the prior art.

In the head-up display device, the method for controlling the same, and the vehicle according to the embodiments of the disclosure, the head-up display device includes a display component, a first optical component, a second optical component, and a synthesizing component, where the display component outputs first projection light in a first polarization direction, and second projection light in a second polarization direction to the first optical component; the first optical component transmits the first projection light and third projection light in the first polarization direction to the synthesizing component, and reflects the second projection light in the second polarization direction to the second optical component; the second optical component converts the second projection light in the second polarization direction into the third projection light in the first polarization direction, and reflects the third projection light back to the first optical component; and the synthesizing component receives the first projection light and the third projection light transmitted through the first optical component to synthesize a first image and a second image respectively, so that the images can be dual-layer displayed to thereby make it comforter to view the images. For example, state information of the vehicle, and augmented reality information can be dual-layer displayed, and the augmented reality information can be displayed at a longer distance from eyes of a driver so that the focus of the human eyes does not need to be adjusted frequently to thereby make it comforter to view the information so as to eliminate a hidden risk.

BRIEF DESCRIPTION OF THE DRAWINGS

In order to make the technical solutions according to the embodiments of the disclosure more apparent, the drawings to which reference is to made in the description of the embodiments of the disclosure will be introduced below in brief. Apparently the drawings to be described below illustrate only some embodiments of the disclosure, and those ordinarily skilled in the art can further derive other drawings from these drawings without any inventive effort.

DETAILED DESCRIPTION

In order to make the objects, features, and advantages above of the disclosure more apparent, the disclosure will be described below in further details in connection with particular embodiments thereof with reference to the drawings.

Figure 1:
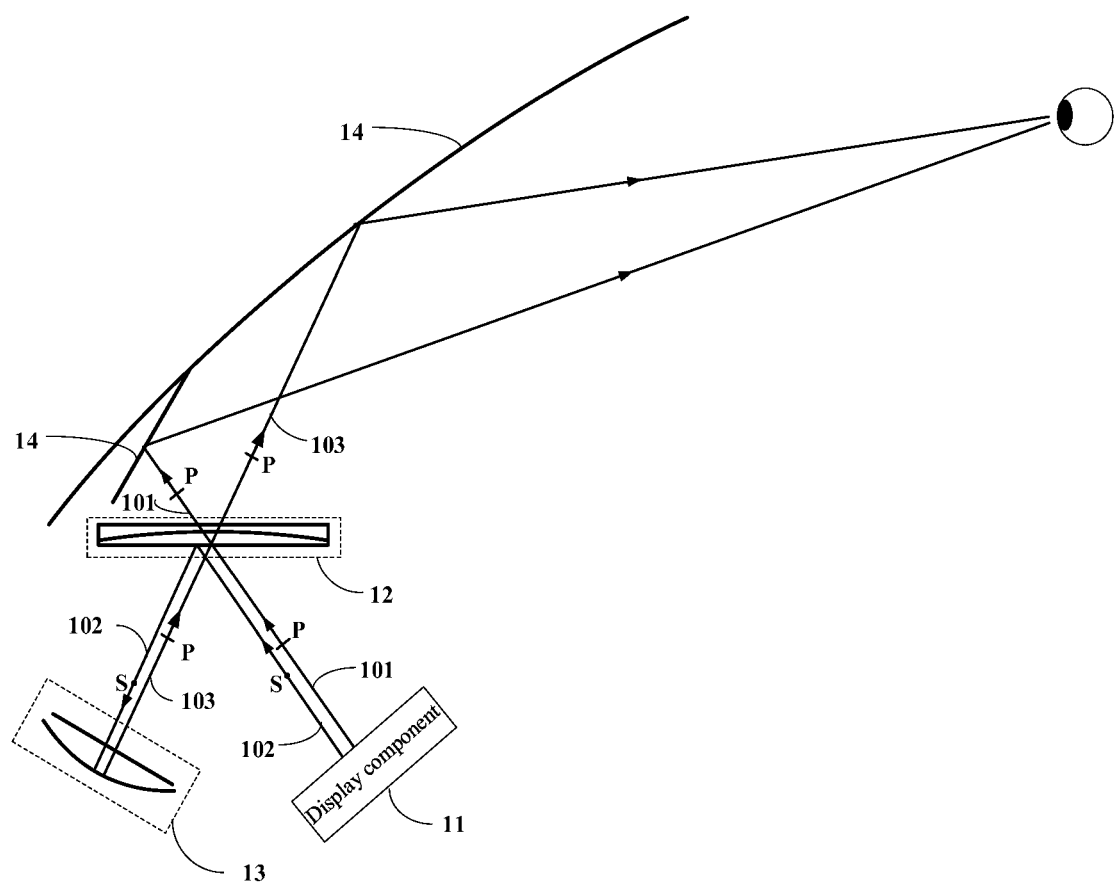
FIG. 1 illustrates a schematic structural diagram of a head-up display device according to an embodiment of the disclosure.

As illustrated in FIG. 1, a head-up display device according to an embodiment of the disclosure can include a display component 11, a first optical component 12, a second optical component 13, and a synthesizing component 14. The display component 11 is configured to output first projection light 101 and second projection light 102 to the first optical component 12, where the first projection light 101 has a first polarization direction, and the second projection light 102 has a second polarization direction; the first optical component 12 is configured to transmit the first projection light 101 and third projection light 103 to the synthesizing component 14, and to reflect the second projection light 102 to the second optical component 13, where the third projection light 103 has the first polarization direction; the second optical component 13 is configured to convert the polarization direction of the second projection light 102 from the second polarization direction to the first polarization direction to obtain the third projection light 103, and to reflect the third projection light 103 back to the first optical component 12; and the synthesizing component 14 is configured to receive the first projection light 101 transmitted through the first optical component 12 to synthesize a first image, and to receive the third projection light 103 transmitted through the first optical component 12 to synthesize a second image.

Specifically the display component 11 can output the first projection light 101 in the first polarization direction, and the second projection light 102 in the second polarization direction concurrently, or can output the first projection light 101 in the first polarization direction, and the second projection light 102 in the second polarization direction alternatively in a time-division multiplexing mode.

The first optical component 12 can be any optical element capable of transmitting an incident light component in some polarization direction or state, and reflecting an incident light component in another polarization direction or state, e.g., a polarized light splitting element, etc.

The second optical component 13 can be any element capable of converting a polarization direction or state of incident light, and reflecting light, e.g., a combination of a reflecting mirror and a quarter-wavelength sheet, etc., as described in details in the following embodiment.

The synthesizing component 14 can be any semi-transmitting optical element capable of transmitting external light, and overlapping an external image with the first image formed of the first projection light 101, or the second image formed of the third projection light 103. As can be appreciated, human eyes can see both the external image, and the projection image (the first image or the second image) due to the synthesizing component 14. The synthesizing component 14 can be a windshield, or an optical element, such as a holographic element, that is independently of the windshield.

In a real application, information to be displayed can include state information and augmented reality information, where the state information refers to a vehicle state, e.g., a vehicle speed, gas temperature, water temperature, etc., all of which can be displayed at a distance of approximately two meters from the eyes of a driver; and the augmented reality information can be indication information of an object outside the vehicle, navigation information, etc., and can be displayed at a longer distance, e.g., five to eight meters, from the eyes of the driver, and since the focus of the human eyes at such a distance doesn't need to be adjusted frequently, it is comfort to view the information.

In this embodiment, state information projection light can correspond to the first projection light 101 in the first polarization direction emitted from the display component 11, where the first projection light is incident to the first optical component 12 and is transmitted through the first optical component 12 to the synthesizing component 14, the synthesizing component 14 receives the first projection light 101 so that the human eyes see the first image, i.e., a state information projection image.

Augmented reality information projection light can correspond to the second projection light 102 in the second polarization direction emitted from the display component 11, where the second projection light is incident to the first optical component 12 and is transmitted through the first optical component 12 to the second optical component 13, the second optical component 13 converts the second projection light 102 in the second polarization direction into the third projection light 103 in the first polarization direction, and reflects the third projection light back to the first optical component 12, and the third projection light is transmitted through the first optical component 12 to the synthesizing component 14, the synthesizing component 14 receives the third projection light 103 so that the human eyes see the second image, i.e., an augmented reality information projection image.

In this embodiment, the first optical component transmits and reflects the light in the different polarization directions or states to thereby separate the state information projection light from the augmented reality information projection light so that the dual-layer display can be achieved, for example, the augmented reality information can be displayed at a long distance from the eyes of the driver so that the focus of the human eyes doesn't need to be adjusted frequently to thereby make it comforter to view the information so as to eliminate a hidden risk.

Figure 2:
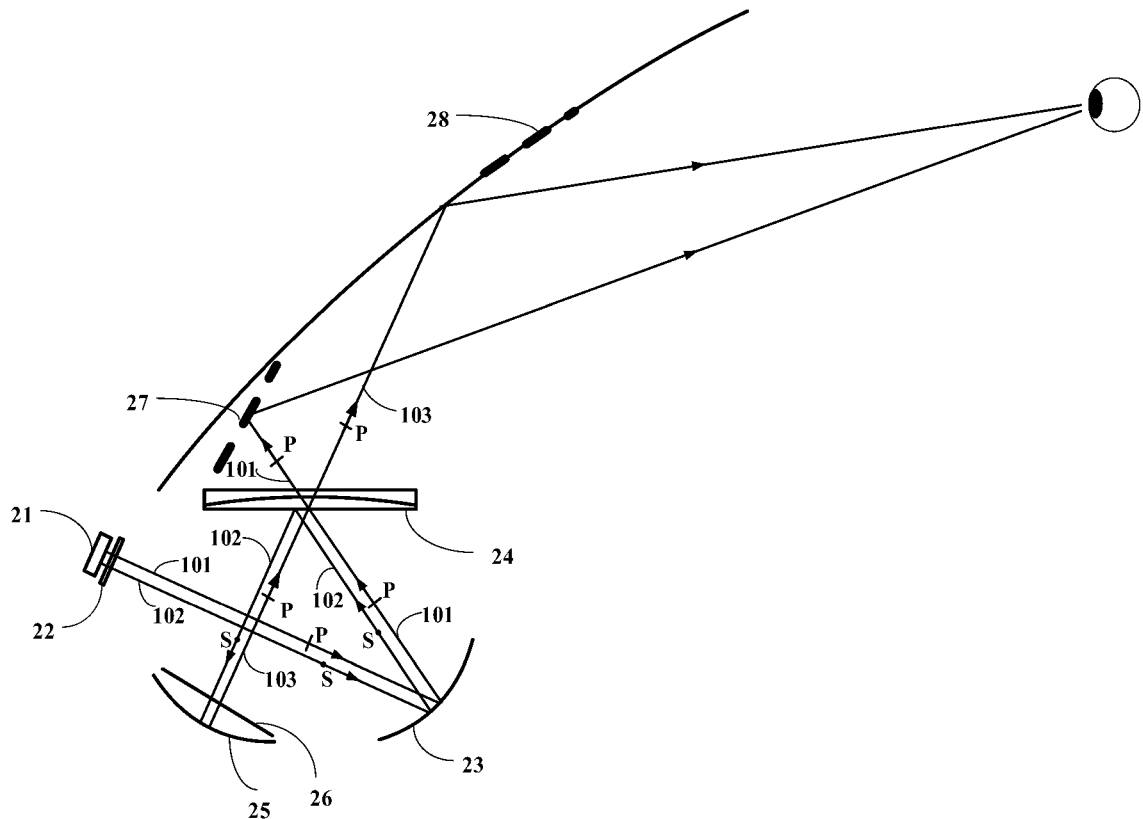
FIG. 2 illustrates a schematic structural diagram of a specific implementation of a head-up display device according to an embodiment of the disclosure.

Specifically as illustrated in FIG. 2, the display component 12 in the embodiment above can include a display element 21 and a third optical module, where the display element 21 is configured to output a first projection image and a second projection image alternately; and the third optical module is configured to convert light of the first projection image into the first projection light 101 in the first polarization direction, to convert light of the second projection image into the second projection light 102 in the second polarization direction, and output them to the first optical component 12.

Since different images, e.g., the state information projection image corresponding to the first projection image, and the augmented reality information projection image corresponding to the second projection image, shall be displayed respectively at dual-layer, the two images can be displayed concurrently using two separate display elements, or the two images can be displayed alternately using one display element in a time division multiplexing mode, in a real application. In this embodiment, the first projection image and the second projection image can be output alternately using one display element 21 to thereby lower power consumption as compared with displaying the two images concurrently using two display elements, and improve the display resolution as compared with displaying the two images in different zones using one display elements. In a real application, the first projection image and the second projection image can be output alternately by controlling an input signal to the display element 21, e.g., a projector, a liquid crystal display, etc.

In order to enable the user to observe the first image (e.g., the state information projection image) and the second image (e.g., the augmented reality information projection image) at the same time, the first projection image and the second projection image shall be output alternately at a higher frequency than a refreshing frequency 30 Hz of the human eyes, e.g., a frequency 60 Hz or higher.

The third optical module can be functionally embodied in a number of implementations, and for example, can include a polarization converting element 22 and a first reflecting mirror 23. The polarization converting element 22 is configured to convert the light of the first projection image into the first projection light 101 in the first polarization direction, and to convert the light of the second projection image into the second projection light 102 in the second polarization direction; and the first reflecting mirror 23 is configured to reflect the first projection light 101 and the second projection light 102 from the polarization converting element 22 to the first optical component 12.

In a real application, the polarization converting element 22 can control electro-optical crystals through voltage to thereby convert a polarization direction or state of light. For example, when light output by the display element 11 is linearly polarized light, the electro-optical crystals can be controlled through voltage so that a polarization direction or state of the transmitted linearly polarized light is rotated or not rotated to thereby convert the light of the first projection image into the first projection light 101 in the first polarization direction, and the light of the second projection image into the second projection light 102 in the second polarization direction. When the display element 21 outputs the first projection image and the second projection image alternately, the conversion frequency of the polarization converting element 22 shall remain consistent with the alternation frequency of the display element 21.

A reflecting face of the first reflecting mirror 23 can be a plane, a spherical surface, a aspheric surface, or a free form surface. The different reflecting faces can be selected for the first reflecting mirror 23 to thereby correct a system aberration. It shall be noted that a plurality of reflecting mirrors can be arranged between the polarization converting element 22 and the first optical component 12 as long as the light transmitted from the polarization converting element 22 is reflected to the first optical component 12. Since there is a small angle of view for the state information projection, generally an aberration can be well corrected using one reflecting mirror (the first reflecting mirror 23) to thereby achieve a good display effect, and narrowing the volume of the entire device. Although there is a large angle of view for augmented reality information projection, an aberration can be corrected by arranging a reflecting mirror in a subsequent light path.

Specifically the first optical component 12 in the embodiment above can include a polarized light splitting element 24, e.g., a polarized light split prism, etc. The polarized light splitting element 24 can be a flat plate structure. A reflecting surface of the polarized light splitting element 24 can be a type of surface sandwiched between two parallel planes, and can be a plane, a spherical surface, an aspheric surface, or a free form surface. The system aberration can be corrected by selecting different reflecting surfaces of the polarized light splitting element 24. It shall be noted that any element capable of transmitting the light in the first polarization direction or state, and reflecting the light in the second polarization direction or state shall fall into the claimed scope of the first optical component 12 in this embodiment.

Specifically the second optical component 13 in the embodiment above can include a second reflecting mirror 25 and a quarter-wave plate 26, where the quarter-wave plate 26 is configured between the second reflecting mirror 25 and the first optical component 12. A reflecting surface of the second reflecting mirror 25 can be a plane, a spherical surface, an aspheric surface, or a free form surface. The system aberration can be corrected by selecting different reflecting surfaces of the second reflecting mirror 25.

Specifically the synthesizing component 14 in the embodiment above can include a first synthesizer 27 and a second synthesizer 28, where the first synthesizer 27 is configured to receive the first projection light 101 transmitted through the first optical component 12 to synthesize the first image, and the second synthesizer 28 is configured to receive the third projection light 103 transmitted through the first optical component 12 to synthesize the second image.

In a real application, the first synthesizer 27 and/or the second synthesizer 28 can be holographic optical elements affixed on the windshield, where the holographic optical elements can enable some external light to be transmitted, but also enable the incident light (e.g., the first projection light 101 or the third projection light 103) to exit in a specific direction (e.g., to the human eyes) independent of the angle of the incident light, through a structure arranged therein.

It shall be noted that the first synthesizer 27 or the second synthesizer 28 will not be limited to a holographic optical element, but may be a windshield, a reflecting mirror, etc., and any semi-transmitting element capable of reflecting or diffracting the incident light (e.g., the first projection light 101 or the third projection light 103) to the human eyes shall fall into the claimed scope of this embodiment.

A light propagating path of two-layer display information will be described below in connection with the head-up display device according to the embodiment of the disclosure by way of an example in which the first projection light 101 (the state information projection light) are P-polarized light, and the second projection light 102 (the augmented reality information projection light) are S-polarized light.

The display element 21 displays the first projection image (the state information projection image) and the second projection image (the augmented reality information projection image) alternately at a preset frequency (e.g., 60Hz). The light of the first projection image is transmitted through the polarization converting element 22, and converted into the first projection light 101 in the P polarization state. The first projection light 101 in the P polarization state is reflected to the polarized light splitting element 24 through the first reflecting mirror 23, transmitted to the first synthesizer 27 through the polarized light splitting element 24, and further reflected or diffracted to the human eyes through the first synthesizer 27, thus resulting in the first image, i.e., the state information projection image.

The second projection image (the augmented reality information projection image) displayed by the display element 21 is transmitted through the polarization converting element 22, and converted into the second projection light 102 in the S polarization state. The second projection light 102 in the S polarization state is reflected to the polarized light splitting element 24 through the first reflecting mirror 23, and reflected to the second optical component 13 through the polarized light splitting element 24. The second projection light 102 in the S polarization state reflected by the polarized light splitting element 24 is transmitted through the quarter-wave plate 26 for the first time, and then the polarization state thereof is changed so that they are converted into left-rotated or right-rotated circularly-polarized light; then the left-rotated or right-rotated circularly-polarized light is reflected by the second reflecting mirror 25, and then the polarization state thereof is changed so that it is converted into right-rotated or left-rotated polarized light; and the right-rotated or left-rotated polarized light is transmitted through the quarter-wave plate 26 again, and then the polarization state thereof is changed so that it is converted into the third projection light 103 in the P polarization state. At this time, the third projection light 103 in the P polarization state is transmitted to the second synthesizer 28 through the polarized light splitting element 24, and further reflected or diffracted by the second synthesizer 28 to the human eyes, thus resulting in the second image, i.e., the augmented reality information projection image. Since there is generally a large angle of view of the projected augmented reality information, an aberration shall be corrected using a large number of reflecting mirrors, and in this embodiment, an aberration can be corrected using the reflecting mirror 23, the reflecting surface of the polarized light splitting element 24, and the second reflecting mirror 25 for a better display effect.

As can be apparent from the light paths of the state information projection and the augmented reality information projection, the reflecting surface of the polarized light splitting element 24, and the second reflecting mirror 25 only appear in the light path of the augmented reality information projection, so the light path can be designed by optimizing the reflecting surfaces of these two optical elements to thereby improve only the light path of the augmented reality information projection, so as to further lower the complexity of the design. Also since the second projection light 102 is reflected back and forth between the reflecting surface of the polarized light splitting element 24, and the second reflecting mirror 25, the light path thereof can be folded to thereby reduce the volume of the entire Head-Up Device (HUD).

Figure 3:
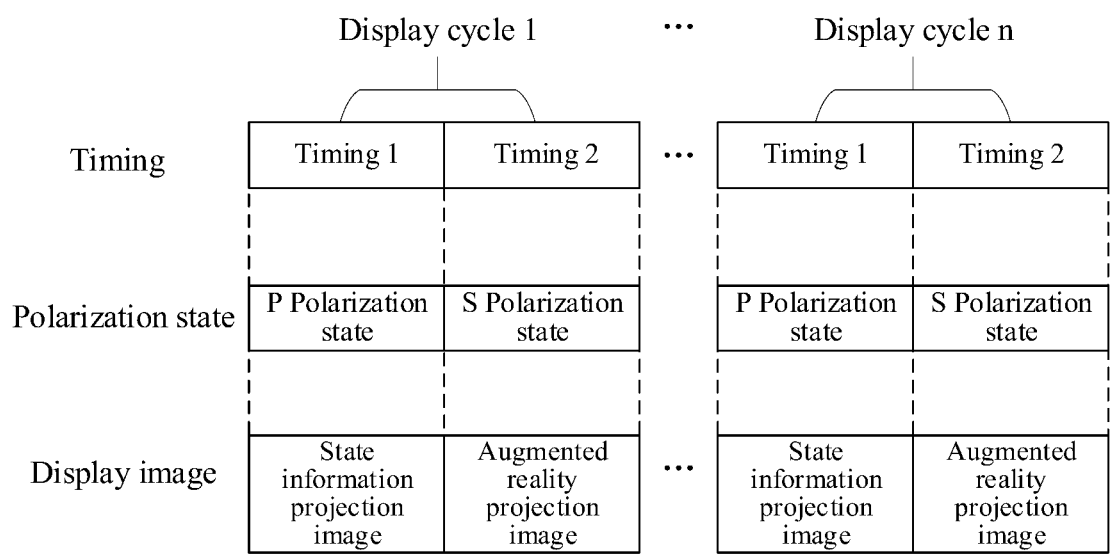
FIG. 3 illustrates a schematic diagram of timing control in a dual-layer display mode according to an embodiment of the disclosure.
Figure 4:
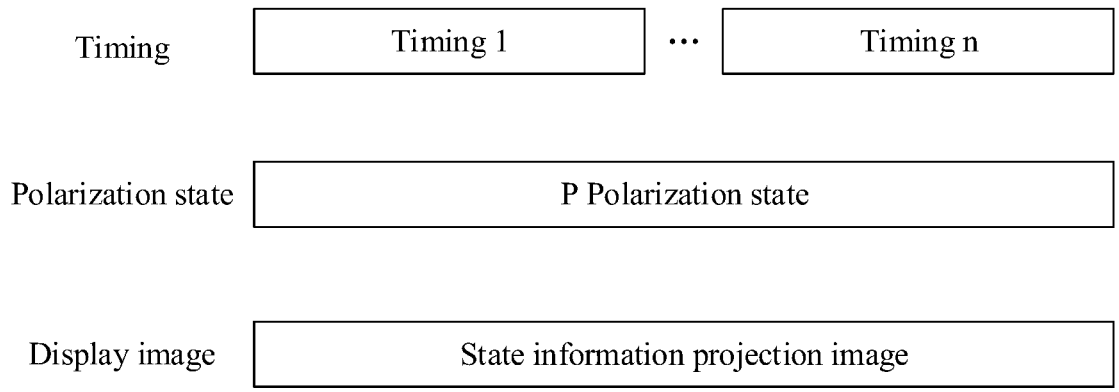
FIG. 4 illustrates a schematic diagram of timing control in a uni-state information projection and display mode according to an embodiment of the disclosure.
Figure 5:
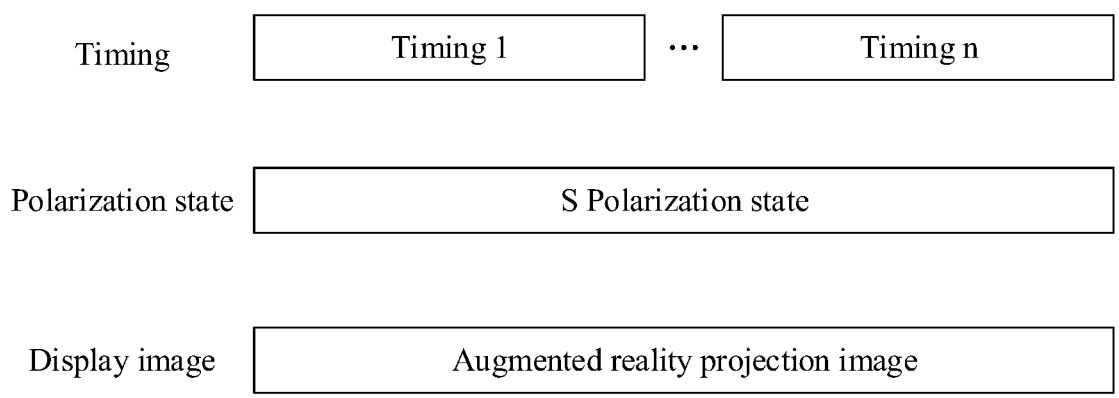
FIG. 5 illustrates a schematic diagram of timing control in a uni-augmented reality information projection and display mode according to an embodiment of the disclosure.

The head-up display device according to this embodiment can further operate in a number of display mode, e.g., a dual-layer display mode, a uni-state information projection and display mode, and a uni-augmented reality information projection and display mode, by controlling an input signal to the display element 21, and the polarization converting element 22 in response to a user demand. When the user selects the dual-layer display mode, as illustrated in FIG. 3, the display element 21 outputs the two projection images according to preset timing and at a preset frequency, and the polarization converting element 22 converts the light into the P or S polarization state according to the same timing and at the same frequency, so that the images are dual-layer displayed. When the user selects the uni-state information projection and display mode, as illustrated in FIG. 4, the display element 21 outputs the system information projection image at a preset frequency, and the polarization converting element 22 converts the light into the P polarization state at the same frequency, thus resulting in the state information projection image. When the user selects the uni-augmented reality information projection and display mode, as illustrated in FIG. 5, the display element 21 outputs the augmented reality projection image at a preset frequency, and the polarization converting element 22 converts the light into the S polarization state at the same frequency, thus resulting in the augmented reality information projection image.

Another embodiment of the disclosure further provides a vehicle including the head-up display device according to any one of the embodiments above of the disclosure.

Specifically the head-up display device can display state information of the vehicle, and augmented reality information at dual layers, and the augmented reality information can be displayed at a longer distance from eyes of a driver so that the focus of the human eyes doesn't need to be adjusted frequently to thereby make it comforter to view the information so as to eliminate a hidden risk.

Figure 6:
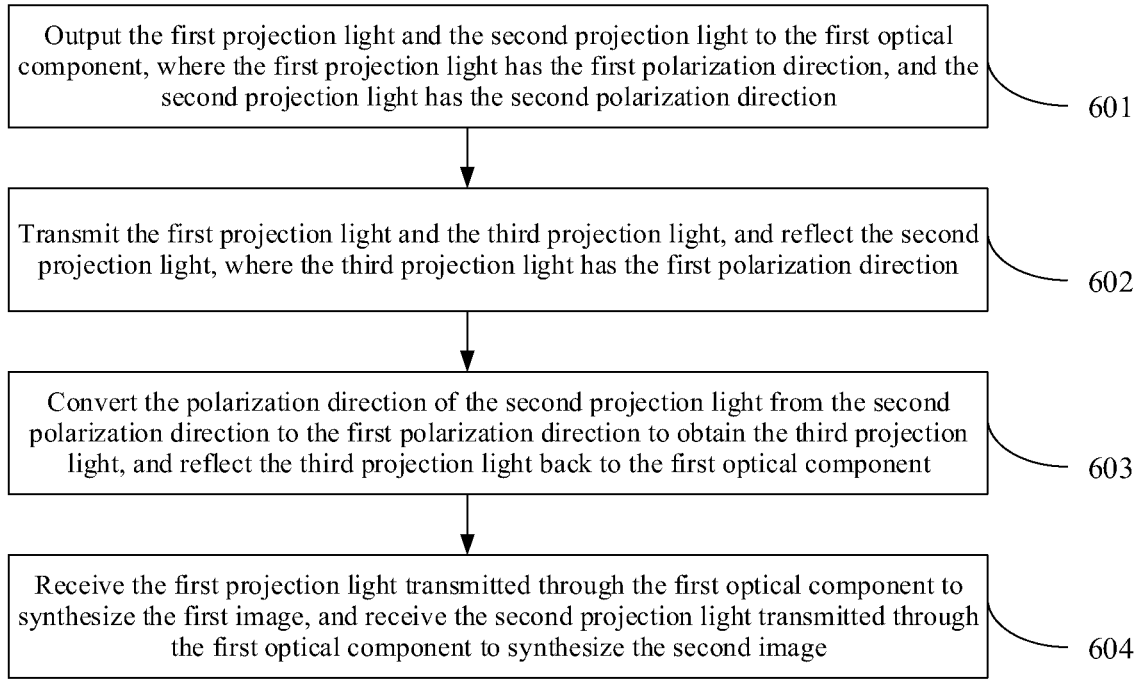
FIG. 6 illustrates a flow chart of the steps in a method for controlling a head-up display device according to an embodiment of the disclosure.

Another embodiment of the disclosure further provides a method for controlling the head-up display device according to any one of the embodiments above of the disclosure, and as illustrated in FIG. 6, the method can include the following steps.

The step 601 is to output the first projection light and the second projection light to the first optical component, where the first projection light has the first polarization direction, and the second projection light has the second polarization direction.

In a real application, the first projection light and the second projection light can be output to the first optical component through the display component in the embodiment above.

The step 602 is to transmit the first projection light and the third projection light, and to reflect the second projection light, where the third projection light has the first polarization direction.

Specifically the first projection light and the third projection light in the first polarization direction can be transmitted through the first optical component in the embodiment above, and the second projection light in the second polarization direction can be reflected through the first optical component.

The step 603 is to convert the polarization direction of the second projection light from the second polarization direction to the first polarization direction to obtain the third projection light, and to reflect the third projection light back to the first optical component.

Specifically the second optical component in the embodiment above can convert the second projection light in the second polarization direction into the third projection light in the first polarization direction, and to reflect the third projection light back to the first optical component.

The step 604 is to receive the first projection light transmitted through the first optical component to synthesize the first image, and to receive the second projection light transmitted through the first optical component to synthesize the second image.

Specifically this step can be performed by the synthesizing component in the embodiment above.

In an implementation of this embodiment, the step 601 can further include the following steps.

The step 701 is to output the first projection image and the second projection image alternately.

In a real application, the first projection image and the second projection image can be output alternately by the display element.

The step 702 is to convert the light of the first projection image into the first projection light in the first polarization direction, to convert the light of the second projection image into the second projection light in the second polarization direction, and to output them to the first optical component.

In a real application, this step can be performed by the third optical module, where the third optical module can include the polarization converting element and the first reflecting mirror.

In order to provide various display modes, before the step 701, the method can further include the following steps.

The step 801 is to obtain mode selection information of a user. Then the step 701 can include: outputting the first projection image or the second projection image, or outputting the first projection image and the second projection image alternately, according to the mode selection information of the user.

In the head-up display device, the method for controlling the same, and the vehicle according to the embodiments of the disclosure, the head-up display device includes a display component, a first optical component, a second optical component, and a synthesizing component, where the display component outputs first projection light in a first polarization direction, and second projection light in a second polarization direction to the first optical component; the first optical component transmits the first projection light and third projection light in the first polarization direction to the synthesizing component, and reflects the second projection light in the second polarization direction to the second optical component; the second optical component converts the second projection light in the polarization direction into the third projection light in the first polarization direction, and reflects the third projection light back to the first optical component; and the synthesizing component receives the first projection light and the third projection light transmitted through the first optical component to synthesize them into a first image and a second image respectively, so that the images can be dual-layer displayed to thereby make it comforter to view the images. For example, state information of the vehicle, and augmented reality information can be dual-layer displayed, and the augmented reality information can be displayed at a longer distance from eyes of a driver so that the focus of the human eyes does not need to be adjusted frequently to thereby make it comforter to view the information so as to eliminate a hidden risk.

The respective embodiments in the description have been described progressively, each of the embodiments has been focused on its differences from the other embodiments, and the description of their commonalities can be applied to each other.

Lastly it shall be further noted that such relationship terms in this context as first and second, etc., are merely intended to distinguish one entity or operation from another entity or operation but not necessarily intended to require or suggest any such a real relationship or order between these entities or operations. Furthermore the terms "include", "comprise", and any variants thereof are intended to encompass nonexclusive inclusion so that a process, a method, an article or a device including a series of elements includes both those elements and one or more other elements which are not listed explicitly or one or more elements inherent to the process, the method, the article or the device. Unless stated otherwise, an element being defined in the sentence "include/comprise a(n) . . . " will not exclude the presence of one or more additional identical element in the process, the method, the article or the device including the element. The vehicle can be a motorcycle, an automobile, an airplane, a train, a steamship, airship, etc.

The head-up display device, the method for controlling the same, and the vehicle according to the embodiments of the disclosure have been described above in details, and the principle of the disclosure and the embodiments thereof have been set forth in this context by way of several examples, but the embodiments above have been described only for the purpose of facilitating understanding of the method of the disclosure and the core idea thereof; and moreover those ordinarily skilled in the art can modify the embodiments and application scopes of the disclosure without departing from the spirit of the disclosure, and in summary the disclosure of the disclosure will not be construed as limiting the disclosure.

The invention claimed is:

1. A head-up display device, comprising: a display component, a first optical component, a second optical component, and a synthesizing component, wherein:
   the display component is configured to output first projection light and second projection light to the first optical component, wherein the first projection light has a first polarization direction, and the second projection light has a second polarization direction;
   the first optical component is configured to transmit the first projection light and third projection light to the synthesizing component, and to reflect the second projection light to the second optical component, wherein the third projection light has the first polarization direction;
   the second optical component is configured to convert a polarization direction of the second projection light from the second polarization direction to the first polarization direction to obtain the third projection light, and to reflect the third projection light back to the first optical component; and
   the synthesizing component is configured to receive the first projection light having the first polarization direction transmitted through the first optical component to synthesize a first image, and to receive the third projection light having the first polarization direction transmitted through the first optical component to synthesize a second image;
   wherein the third projection light has the first polarization direction when received by the synthesizing component.

2. The head-up display device according to claim 1, wherein the display component comprises:
   a display element configured to output a first projection image and a second projection image alternately; and
   a third optical module configured to convert light of the first projection image into the first projection light in the first polarization direction, to convert light of the second projection image into the second projection light in the second polarization direction, and output the first projection light and the second projection light to the first optical component.

3. The head-up display device according to claim 2, wherein the third optical module comprises:
   a polarization converting element configured to convert the light of the first projection image into the first projection light in the first polarization direction, and to convert the light of the second projection image into the second projection light in the second polarization direction; and a first reflecting mirror configured to reflect the first projection light and the second projection light from the polarization converting element to the first optical component.

4. The head-up display device according to claim 3, wherein a reflecting surface of the first reflecting mirror is a plane, a spherical surface, an aspheric surface, or a free form surface.

5. The head-up display device according to claim 2, wherein the first projection image and the second projection image are output alternately at a frequency 60 Hz or higher.

6. The head-up display device according to claim 1, wherein the first optical component comprises a polarized light splitting element.

7. The head-up display device according to claim 6, wherein a reflecting surface of the polarized light splitting element is a plane, a spherical surface, an aspheric surface, or a free form surface.

8. The head-up display device according to claim 1, wherein the second optical component comprises a second reflecting mirror and a quarter-wave plate, the quarter-wave being between the reflecting mirror and the first optical component.

9. The head-up display device according to claim 8, wherein a reflecting surface of the second reflecting mirror is a plane, a spherical surface, an aspheric surface, or a free form surface.

10. The head-up display device according to claim 1, wherein the synthesizing component comprises:
    a first synthesizer configured to receive the first projection light transmitted through the first optical component, and to synthesize the first image; and
    a second synthesizer configured to receive the third projection light transmitted through the first optical component, and to synthesize the second image.

11. The head-up display device according to claim 10, wherein the first synthesizer and/or the second synthesizer are holographic optical elements.

12. The head-up display device according to claim 1, wherein the synthesizing component is a semi-transmitting optical element; and the first image is a state information projection image, and the second image is an augmented reality information projection image.

13. A vehicle, comprising the head-up display device according to claim 1.

14. A method for controlling the head-up display device according to claim 1, the method comprising:
    outputting the first projection light and the second projection light to the first optical component, wherein the first projection light has the first polarization direction, and the second projection light has the second polarization direction;
    transmitting the first projection light and the third projection light, and reflecting the second projection light, wherein the third projection light has the first polarization direction;
    converting the polarization direction of the second projection light from the second polarization direction to the first polarization direction to obtain the third projection light, and reflecting the third projection light back to the first optical component; and
    receiving the first projection light transmitted through the first optical component to synthesize the first image, and receiving the second projection light transmitted through the first optical component to synthesize the second image.

15. The method for controlling the head-up display device according to claim 14, wherein the outputting the first projection light and the second projection light to the first optical component comprises:
   outputting the first projection image and the second projection image alternately; and
   converting light of the first projection image into the first projection light in the first polarization direction, converting light of the second projection image into the second projection light in the second polarization direction, and outputting the first projection light and the second projection light to the first optical component.

* * * * *